United States Patent [19]
Cheatham

[11] Patent Number: 5,484,050
[45] Date of Patent: Jan. 16, 1996

[54] CATALOG STACKER AND LOADER

[75] Inventor: James Cheatham, Spout Spring, Va.

[73] Assignee: R. R. Donnelley & Sons Company, Lisle, Ill.

[21] Appl. No.: 293,696

[22] Filed: Aug. 19, 1994

[51] Int. Cl.⁶ .................................................. B65G 25/04
[52] U.S. Cl. ................ 198/468.3; 198/427; 414/795.3; 414/790.4; 53/247; 53/447; 53/541
[58] Field of Search ................... 414/741, 795.3, 414/751; 198/427, 441, 409, 378, 468.3; 53/247, 251, 255, 260, 447, 541

[56] References Cited

U.S. PATENT DOCUMENTS

| | | | |
|---|---|---|---|
| 2,697,507 | 12/1954 | Vergobbi | 53/541 |
| 2,883,812 | 4/1959 | Pechy | 198/378 |
| 2,948,382 | 12/1956 | Russell | 198/35 |
| 3,005,535 | 10/1961 | Kerns et al. | 198/378 |
| 3,648,821 | 3/1972 | Rudolph et al. | 198/378 |
| 3,766,706 | 10/1973 | Graham | 53/260 |
| 4,221,518 | 9/1980 | Cavazza | 414/46 |
| 4,432,685 | 2/1984 | Stauber | 414/31 |
| 4,498,381 | 2/1985 | Convey, Jr. | 100/100 |
| 4,569,620 | 2/1986 | Lynch | 412/21 |
| 4,618,054 | 10/1986 | Muller | 198/409 |
| 4,820,103 | 4/1989 | Dorner et al. | 414/790 |
| 4,829,749 | 5/1989 | Hiyama et al. | 53/247 |
| 5,161,938 | 11/1992 | Traegaardh | 414/751 |
| 5,317,859 | 6/1994 | Schneider et al. | 53/251 |

*Primary Examiner*—Michael S. Huppert
*Assistant Examiner*—Douglas A. Hess
*Attorney, Agent, or Firm*—Marshall, O'Toole, Gerstein, Murray & Borun

[57] ABSTRACT

A catalog stacker and loader having a conveyor, a cage assembly associated with the conveyor, and a loader for unloading catalogs from the cage assembly and loading them into shipping containers. The cage assembly has a first cage and a second cage, each of which is movable between a loading position adjacent the conveyor and an unloading position adjacent the loader. Each cage is dimensioned to receive two stacks of catalogs and comprises means for holding the two stacks in a first relative orientation when the cage is in a first position and for holding the two stacks in a second relative orientation when the cage is in a second position.

14 Claims, 6 Drawing Sheets

CATALOG STACKER AND LOADER

BACKGROUND OF THE INVENTION

The present invention is directed to an apparatus for stacking printed and bound articles, such as catalogs, and loading them into shipping containers, such as cardboard boxes.

Previously, after being printed and bound, catalogs were mechanically moved along a conveyor past a number of personnel who were seated adjacent the conveyor. As the catalogs moved past the personnel, they would manually remove the catalogs from the conveyor and place the catalogs into shipping cartons, which would then be shipped to the appropriate locations. This manual loading of the shipping cartons is unduly time-consuming and expensive.

SUMMARY OF THE INVENTION

The present invention is directed to an apparatus and a method for automatically transferring articles, such as catalogs, from a conveyor into containers, such as shipping cartons, without the need for manual intervention.

The apparatus includes a conveyor, a cage assembly associated with the conveyor in which articles are stacked, and a loader for unloading the stacks of articles from the cage assembly and loading them into a shipping container. The cage assembly has a first cage and a second cage, each of which is movable between a loading position adjacent the conveyor and an unloading position adjacent the loader. Each cage is dimensioned to receive two stacks of articles, and each cage holds the two stacks in a first relative orientation when the cage is in a first position and a second relative orientation when the cage is in a second position. The two stacks of articles may be held in an end-to-end orientation when each cage is in a loading position and a side-to-side orientation when each cage is in an unloading position.

Each cage may have a first cage structure with three side walls, a second cage structure with three side walls, and a hinge member pivotally connecting the first cage structure to the second cage structure. The side walls of the cage structures may comprise a plurality of spaced-apart, vertically disposed rods. The loader may comprise first and second clamping mechanisms, each of which has a pair of clamping arms vertically movable relative to each other.

The apparatus may additionally include a second conveyor for conveying the shipping containers to a second loading position, and the loader may additionally include means for horizontally moving the first and second clamping mechanisms between a first position adjacent the cage assembly and a second position adjacent the second conveyor.

The method includes the steps of moving a plurality of articles along a conveyor to a stacking position at which the articles are stacked within a first cage in a pair of stacks having a first relative orientation. The first relative orientation of the stacks of articles is then changed to a second relative orientation, the stacks are unloaded from the first cage, and then the stacks are loaded into a shipping container. In the method, articles from the conveyor may be stacked within a second cage when the second cage is in a loading position and when the first cage is being unloaded.

These and other features and advantages of the present invention will be apparent to those of ordinary skill in the art in view of the detailed description of the preferred embodiment, which is made with reference to the drawings, a brief description of which is provided below.

DETAILED DESCRIPTION OF A PREFERRED EMBODIMENT

Figures 1, 2:
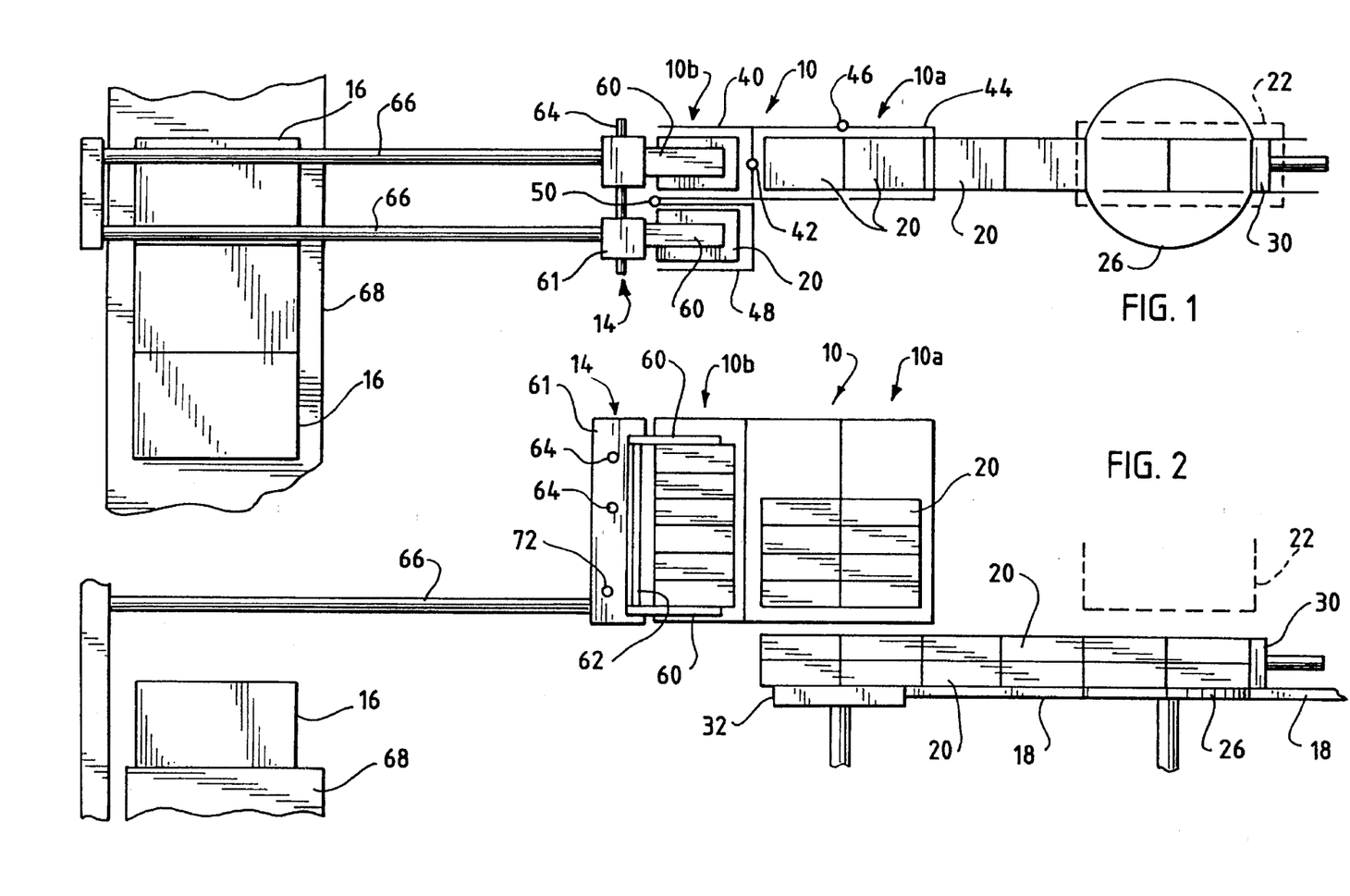
FIG. 1 is a schematic top view of a preferred embodiment of a catalog stacker and loader in accordance with the invention.
FIG. 2 is a schematic side view of the catalog stacker and loader of FIG. 1.

A preferred embodiment of a catalog stacker and loader in accordance with the invention is shown schematically in FIGS. 1 and 2. The catalog stacker and loader includes a rotatable cage assembly generally designated 10 into which groups of catalogs are vertically pushed from below and a catalog loader generally designated 14 which automatically removes stacks of catalogs from the cage assembly 10 and loads them into empty boxes 16 for shipping. The term "catalogs" as used herein is intended to broadly include any type of printed and bound articles such as catalogs, books, magazines, etc.

Initially, the catalogs are placed onto a conveyor platform 18 in groups, each of which is designated 20, by a loading device 22 shown schematically above the conveyor platform 18. Although not part of the invention, the loading device 22 drops two catalog groups 20 onto a turntable 26, then the turntable 26 rotates 180°, and the loading device 22 drops two more catalog groups 20 onto the turntable 26. The purpose of rotating the bottom two catalog groups 20 by 180° is so that the bound sides of the catalogs in the lower and upper groups 20 are opposite so that the catalog groups 20 will not "lean" to one side due to non-uniform thickness between the bound and unbound sides of the catalogs.

After four groups 20 of catalogs are deposited onto the conveyor platform 18 by the loading device 22, a horizontal pusher 30 pushes them leftward towards the cage assembly 10. As soon as four groups 20 of catalogs are moved to a position above a vertical pusher 32, the pusher 32 pushes the catalog groups 20 upwards into a first cage 10a of the cage assembly 10.

The bottom portion of the cage assembly 10 has a plurality of retractable, spring-loaded catalog retainers 34 (shown in FIG. 10) for retaining the catalogs so that after the vertical pusher 32 has pushed the catalogs upwards past the bottom portion of the cage 10a and then retracts downwardly, the catalogs are supported within the cage 10a by the retainers 34.

Referring to FIG. 1, the cage assembly 10 has two cages 10a, 10b. The cage assembly 10 is formed from three rotatable cage portions which include an H-shaped portion 40 rotatable about a vertical center shaft 42, a first U-shaped portion 44 pivotal via a vertical hinge member in the form of a rod 46, and a second U-shaped portion 48 pivotal via a vertical rod 50. A number of vertically disposed rods 52 (shown in FIG. 10) are provided about the periphery of the cage portions 40, 44, 48 so as to retain the stacked catalog groups 20 within the cages 10a, 10b.

Referring to FIG. 2, the provision of two cages 10a, 10b allows for more efficient operation in that one cage can be loaded with catalog groups 20 via the vertical pusher 32 while the other cage (which was previously loaded) can be unloaded by the catalog loader 14.

The catalog loader 14 is composed of two sets of generally C-shaped clamps each of which is composed of a pair of horizontal arms 60 connected to a pair of frame members 61. The arms 60 are vertically movable with respect to each other along a number of vertical rods 62 (FIG. 2). As shown in FIG. 1, the two frame members 61 can also be moved, relative to each other, together and apart via a number of horizontal rods 64. The catalog loader 14 can be translated along a pair of horizontal carriage rods 66 between the cage assembly 10 and a conveyor 68 upon which the empty boxes 16 are conveyed. The catalog loader 14 is also pivotal on a rotating support shaft 72 (shown in FIG. 2).

Figure 3:
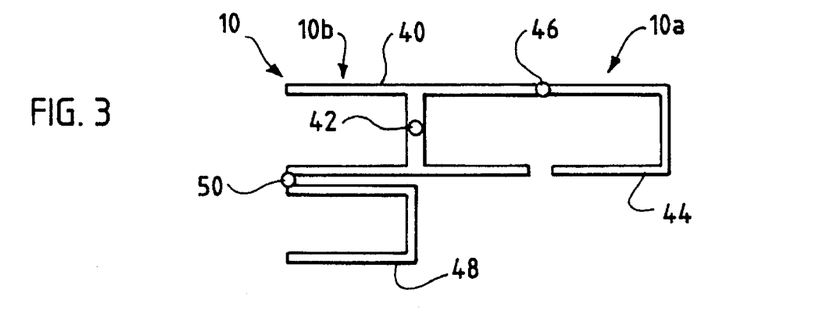
FIGS. 3–6 schematically illustrate a number of sequential positions which the cage assembly of FIG. 1 occupies when moving from a first position to a second position.

The cage assembly 10 is rotatable in a manner described below in connection with FIGS. 3–9, which are schematic top views of the cage assembly 10 in successive positions. FIG. 3 illustrates the cage assembly 10 in its position as shown in FIGS. 1 and 2, with the cage 10a positioned over the vertical pusher 32, during which time the cage 10a can be loaded with catalogs. After the cage 10a is fully loaded and the cage 10b has been unloaded by the catalog loader 14, the three cage portions 40, 44, 48 begin to simultaneously rotate and pivot in three directions as indicated by the three arrows in FIG. 4. The H-shaped portion 40 rotates clockwise about the center shaft 42, and the two U-shaped portions 44, 48 begin to pivot about their hinge rods 46, 50, respectively, relative to the H-shaped portion 40. The rotation continues, and the three portions 40, 44, 48 successively move to their positions shown in FIG. 5, and then to those shown in FIG. 6. In the latter position, the catalogs in the cage 10a can be unloaded by the loader 14, and the previously unloaded cage 10b can be loaded with catalogs again.

It should be noted that, in the process of rotating, the cage which contains catalogs changes the orientation of the two stacks of catalogs from an end-to-end orientation in the position in which the catalogs were loaded to a side-to-side orientation in the position at which the catalogs are unloaded. This facilitates the subsequent loading of the catalogs into empty boxes in that the overall shape of the re-oriented catalog stacks conforms more closely to standard box sizes.

Figure 7:
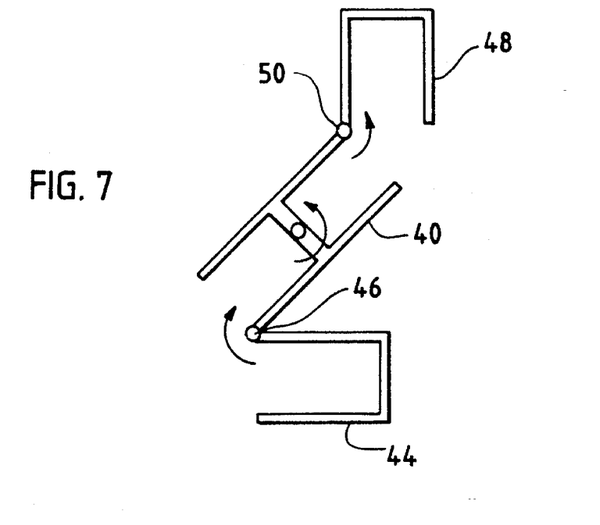
FIGS. 7–9 schematically illustrate a number of sequential positions which the cage assembly occupies when moving from the second position back to the first position.
Figure 8:
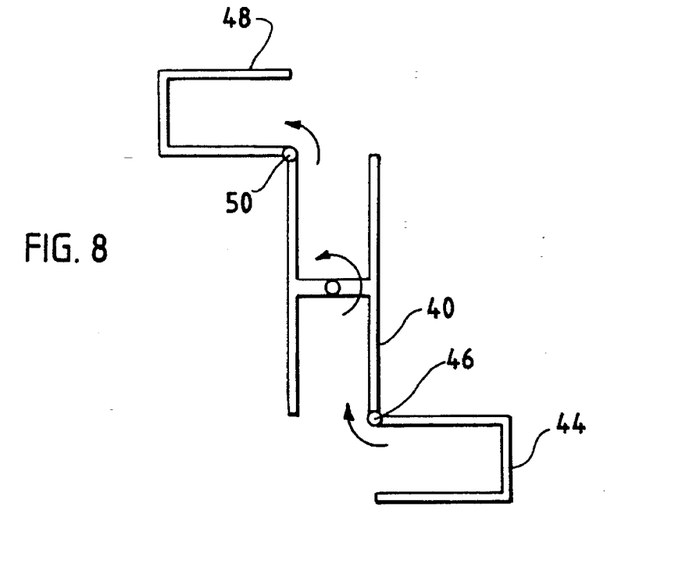
Figure 9:
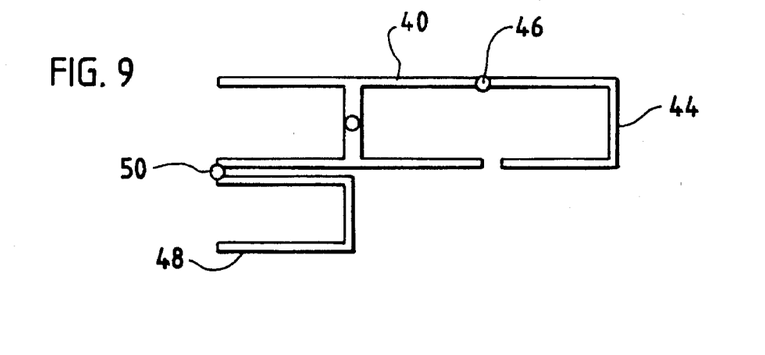

After the cages 10a, 10b are unloaded and loaded, respectively, the cage assembly 10 is again rotated in a similar manner to that described above, except that the direction of rotation of each of the portions 40, 44, 48 is opposite. FIGS. 7, 8 and 9 illustrate the successive positions of the cage assembly 10 during this rotation. It should be noted that, after this rotation is completed, the cage assembly 10 occupies the same position from which it started, as shown in FIG. 3.

Figure 10:
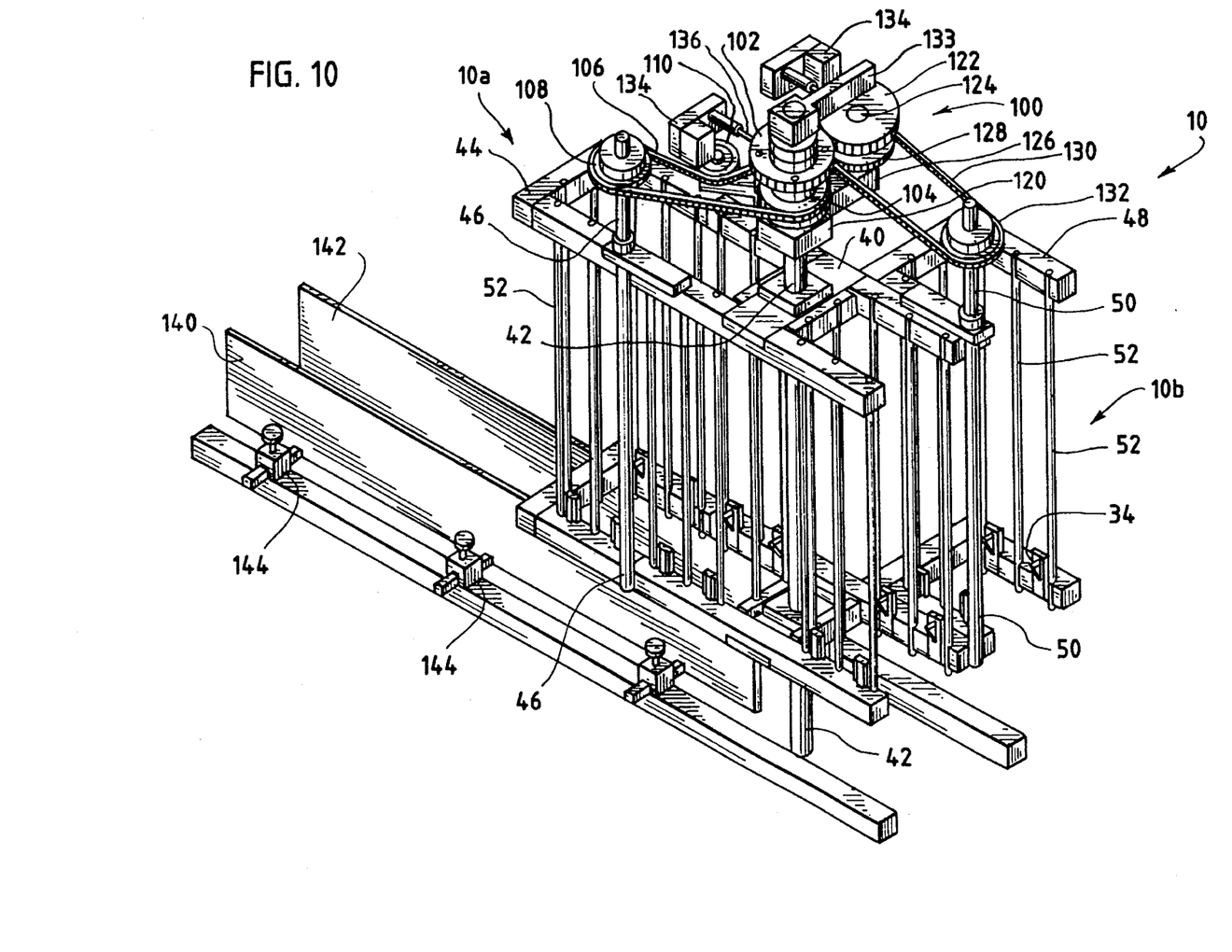
FIG. 10 is a perspective view of a cage assembly of the catalog stacker and loader.

Referring to FIG. 10, the cage assembly 10 includes a gear system 100 for controlling the pivoting of the cages 10a, 10b. The gear system 100 includes an upper stationary gear 102 and a lower stationary sprocket 104 which are disposed about the rotatable center shaft 42 to which the H-shaped cage portion 40 is attached. The stationary gear 102 and sprocket 104 remain positionally fixed and do not rotate, regardless of the rotation of the center shaft 42. The lower stationary sprocket 104 is connected via a chain 106 to a sprocket 108 which is fixed with respect to and rotates with the rotatable rod 46. A rotatable sprocket 110 may be disposed in contact with the chain 106 to take up any slack in the chain 106. The take-up sprocket 110 is supported by an arm which is connected to a base 120 which rotates with the center shaft 42.

The upper stationary gear 102 is disposed in contact with an upper rotatable gear 122 supported by a rod 124 fixed to an arm 126 connected to the rotating base 120. A lower rotatable sprocket 128 is fixed with respect to and rotates with the upper rotatable gear 122. The lower rotatable sprocket 128 is connected via a chain 130 to a sprocket 132 which is fixed with respect to and rotates with the rotatable rod 50. One or two take-up sprockets (not shown) may be disposed in contact with either side of the chain 130.

In operation, as the center shaft 42 which supports the H-shaped cage portion 40 rotates, the vertical rod 46 and the rotatable sprocket 108 move in a circular arc in the direction of rotation of the center shaft 42, due to the rod 46 being connected to the H-shaped cage portion 40. As the rod 106 and the sprocket 108 move, the chain 106 causes the sprocket 108, and thus the rod 46, to rotate in a direction opposite the direction of rotation of the center shaft 42.

Figure 4:
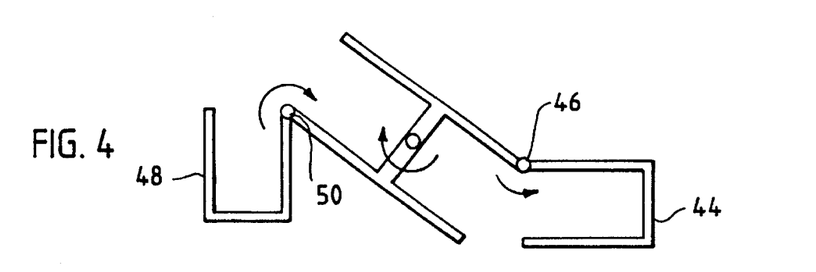
Figure 5:
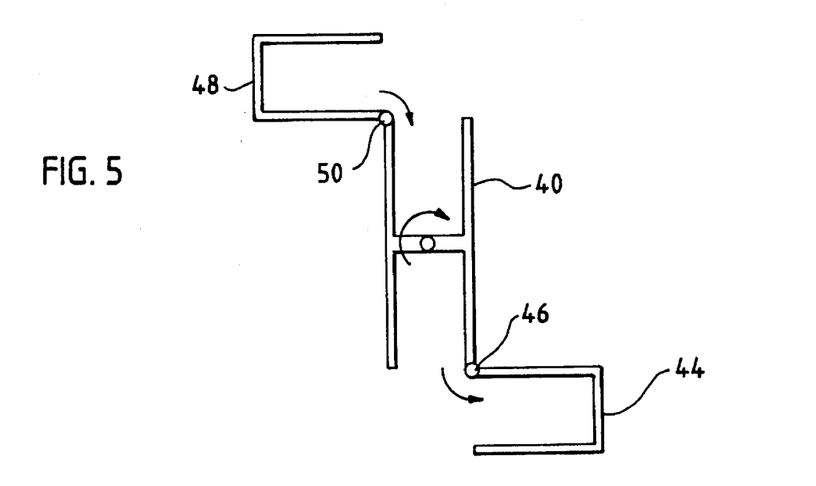
Figure 6:
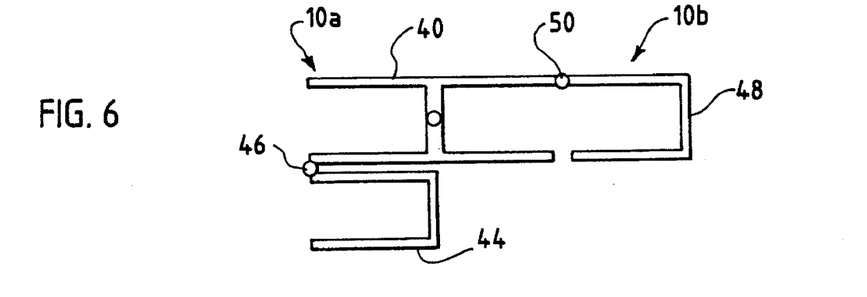

For example, when the center shaft 42 is rotated in a clockwise direction from its position in FIG. 10, the rod 46 will rotate in a counterclockwise direction, which will cause the cage 10a to gradually open up. This movement is schematically shown in FIG. 4.

When the center shaft 42 is rotated, the rotating base 120 and the arm 126 upon which the rotatable gear 122 and sprocket 128 are mounted rotate in the same direction as the center shaft 42, causing the gear 122 and sprocket 128 to move in a circular arc in the same direction as the direction of rotation of the center shaft 42. As the upper rotatable gear 122 moves in the circular arc, it rotates (due to its being in contact with the upper stationary gear 102) in the same direction of rotation as the direction of rotation of the center shaft 42. Consequently, the lower rotatable sprocket 128 also rotates in that same direction, as does the rod 50 which pivotally connects the U-shaped cage portion 48 to the H-shaped cage portion 40.

For example, when the center shaft 42 is rotated in a clockwise direction from its position in FIG. 10, the rod 50 will also rotate in a clockwise direction, which will cause the cage 10b to gradually close. This movement is schematically shown in FIG. 4.

Referring to FIG. 10, a positioning arm 133 is fixed to and rotates with the top of the center shaft 42. The positioning arm 133 makes contact with a pair of mechanical stops 134 fixed to a portion of the support frame (not shown) of the cage assembly 10. Each mechanical stop 134 includes a horizontally disposed, adjustable stop screw 136 which makes contact with one of the two sides of the positioning arm 133 during operation of the cage assembly 10 to limit the rotation of the center shaft 49 0 42 and ensure that the cages 10a, 10b are properly positioned during operation. The rotation of the center shaft 42 may be controlled by a motor (not shown) connected to the bottom of the shaft 42.

FIG. 10 also illustrates a pair of upwardly extending side panels 140, 142, each of which is disposed on one of the two sides of the substantially flat conveyor platform 18 (FIG. 2) so as to prevent the catalogs from falling off the conveyor platform 18. Each of the side panels 140, 142 is supported and positioned by a number of connectors 144 which allow the relative spacing between the side panels 140, 142 to be adjusted to accomodate catalogs of different sizes.

Figure 13:
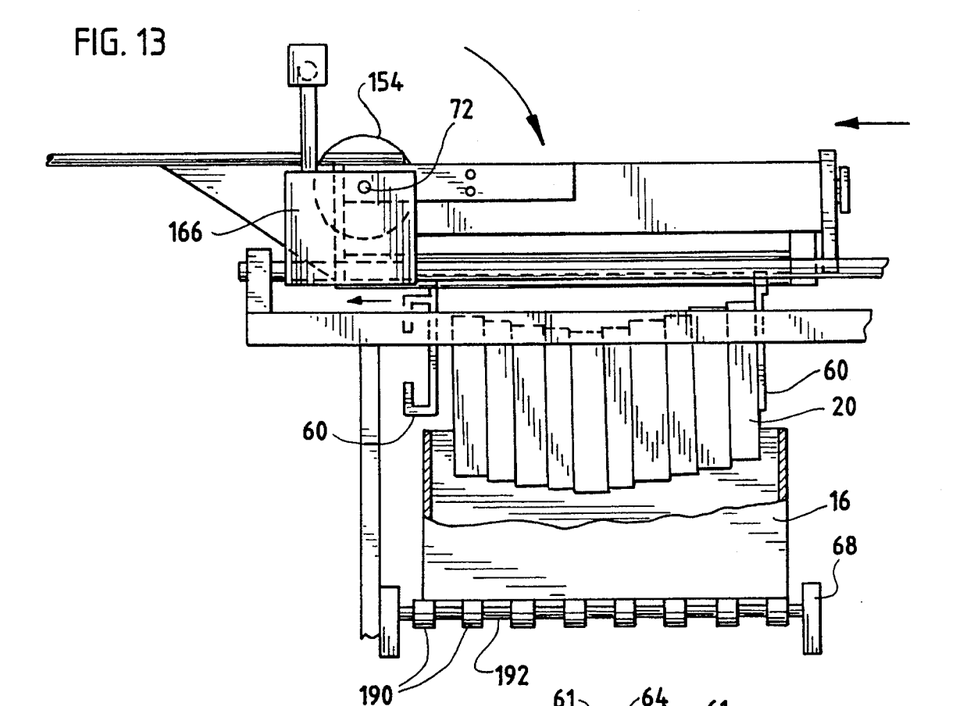
FIG. 13 is a side view of the catalog loader in a third position.
Figure 14:
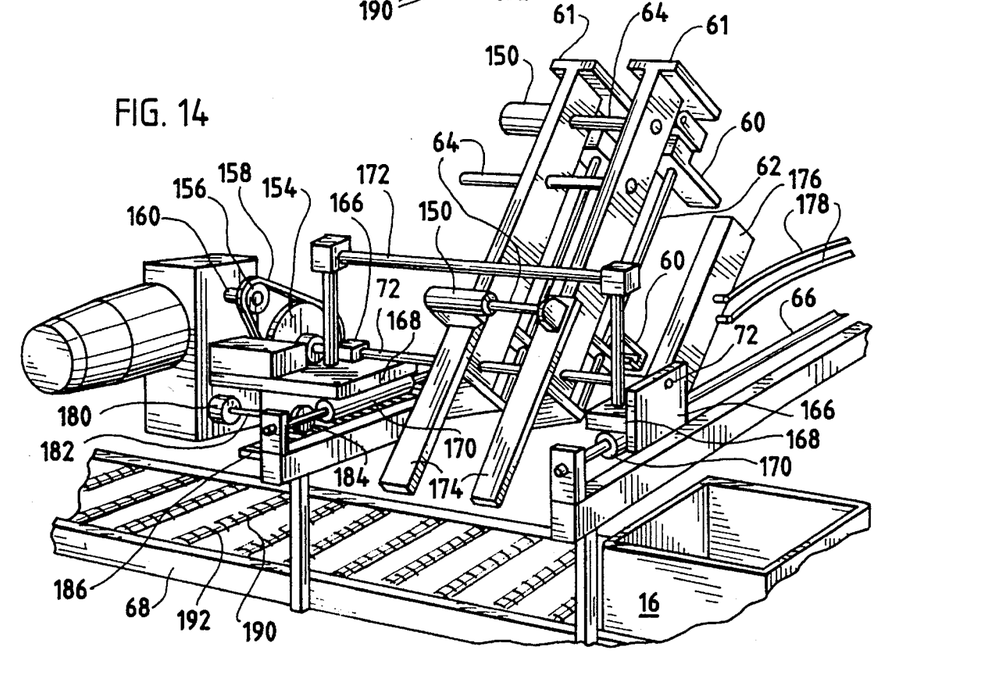
FIG. 14 is a perspective view of the catalog loader.

FIGS. 11–14 illustrate the loader 14 in more detail. Referring to FIG. 14, the two upper arms 60 of the loader 14 are fixed and do not move during operation of the loader 14, and the two lower arms 60 are vertically movable up and down along the rods 62. The vertical movement of the lower arms 60 is controlled by a pair of pneumatically powered cylinders (not shown).

The two frame members 61 of the loader 14 are movable relative to each other along rods 64, two of which are associated with a pair of pneumatically powered air cylinders 150 which control the relative movement of the frame members 61. The left-hand frame member 61 is fixed to the rotatable support shaft 72 so that that frame member 61 pivots as the support shaft 72 is rotated. The right-hand frame member 61 is not fixed to the support shaft 72, but is slidably supported on the shaft 72 so that the frame members 61 are relatively movable towards and away from each other.

The support shaft 72 is fixed to and rotated by a first sprocket 154 having a relatively large diameter. The sprocket 154 is coupled to a smaller sprocket 156 via a chain 158 coupled to a motor (not shown) via a drive shaft 160. The support shaft 72 is supported by a pair of mounting blocks 166 through which the support shaft 72 passes. The mounting blocks 166 are fixed to a number of carriage plates 168, which are in turn connected for slidable movement on the carriage rods 66 via a pair of cylindrically shaped slide bearings 170 disposed on the carriage rods 66.

The loader 14 has a stabilizer 172 comprising three rigidly interconnected rods, two of which are vertically disposed and one of which is horizontally disposed, the two vertical rods being connected to the carriage plates 168. The stabilizer 168 helps stabilize and maintain the structural integrity of the loader 14. The loader 14 may also be provided with a pair of downwardly projecting extensions 174 to facilitate attachment of a counterweight, if necessary.

The loader 14 also has a cable support member 176 which supports a number of pneumatic lines or cables 178 which are connected to supply pressurized air to the air cylinders which drive the various mechanical movements of the loader 14. The cable support member 176 is fixed to and rotates with the rotatable support shaft 72 so as to prevent entanglement of the cables 178 due to pivoting of the loader 14. Although the pneumatic cables 178 pass through and emerge from the other side of the support member 176, those portions of the pneumatic cables 178 as well as their connection to the various air cylinders have not been shown in FIG. 14 for purposes of simplicity and clarity.

The horizontal movement of the loader 14 along the carriage rods 66 is controlled by a drive assembly connected to one of the carriage plates 168. The drive assembly comprises a motor 180, a drive shaft 182 connected to the motor 180 and fixed to a gear 184, and a gear rack 186 in contact with the gear 184 and fixed with respect to the carriage rods 66. Actuation of the motor 180 causes the gear 184 to rotate (in either direction), which in turn causes the loader 14 to move along the carriage rods 66 with respect to the fixed gear rack 186.

The motor 180 may be an AC frequency drive motor having a built-in position encoder so that, in a conventional manner similar to a stepping motor, the precise position of the loader 14 along the carriage rods 66 can be controlled by suitably controlling the actuation of the motor 180. One or more conventional limit switches (not shown) may be positioned towards either end of the carriage rods 66. One of the limit switches could be used as a home switch, and two other limit switches could be used to prevent overtravel of the loader 14 on the carriage rods 66.

FIG. 14 also illustrates the conveyor 68 for positioning the boxes 16 for loading underneath the loader 14. The conveyor 68 may include a plurality of non-powered rollers 190 supported by a plurality of support rods 192 (also shown in FIG. 13) and one or two conventional lug chains or belts (not shown) having a plurality of upwardly projecting lugs which subdivide the lug chain into conveyor spaces, with each box 16 being provided in one of the conveyor spaces between adjacent lugs.

The lug chain, which provides the motive power to the boxes 16 to propel them along the conveyor 68, may be periodically moved a predetermined amount, or indexed, each time a load of catalogs is deposited into an empty box 16 by the loader. The indexing mechanism may comprise a gear (not shown) which supports the lug chain, with each rotation of the gear causing the lug chain to be advanced by the desired amount. The particular construction of the conveyor 68 is not important to the invention, and other constructions could be utilized.

Figures 11, 12:
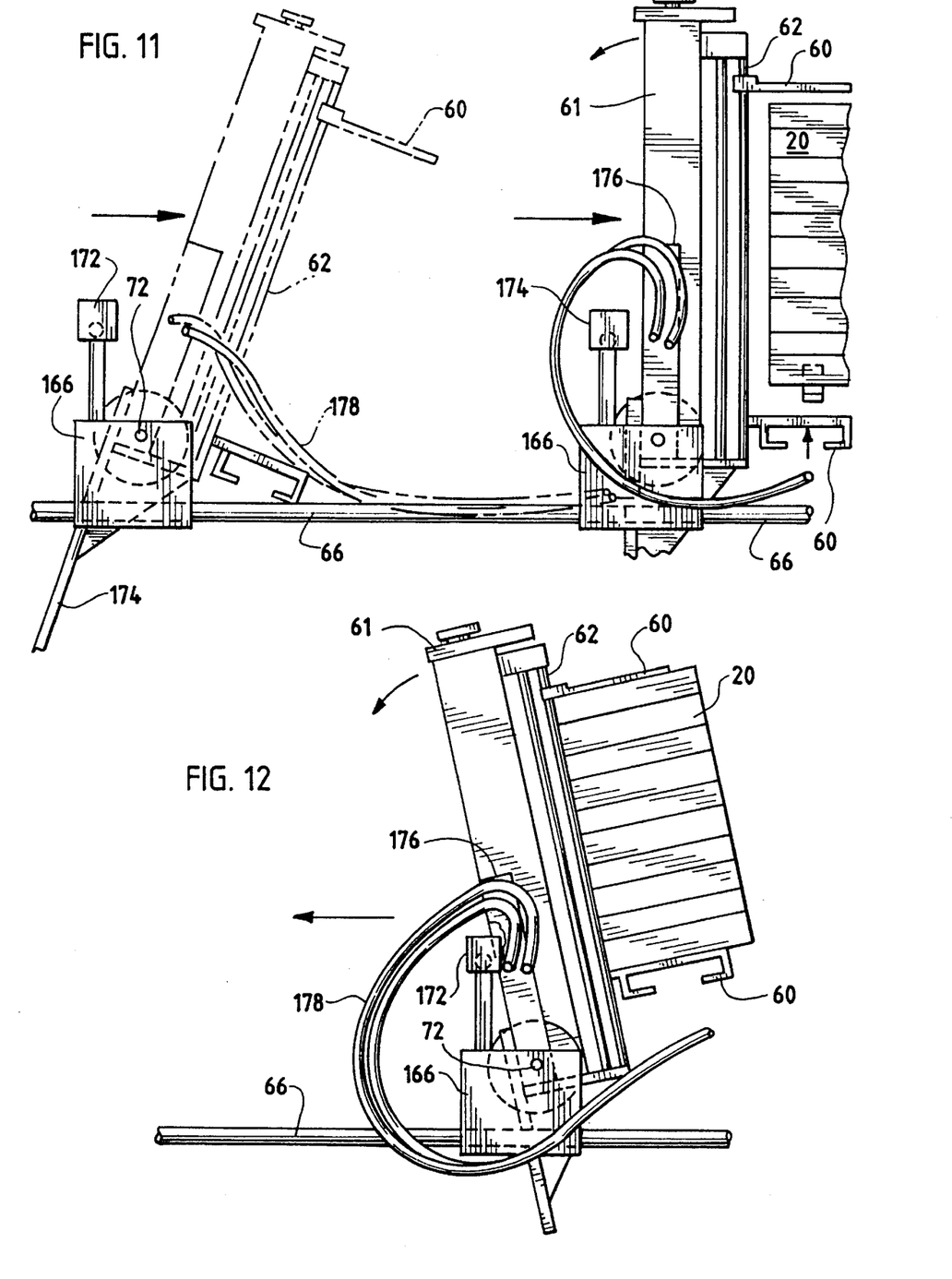
FIG. 11 is a side view of a catalog loader of the stacker and loader of FIG. 1 with the catalog loader in a first position.
FIG. 12 is a side view of the catalog loader in a second position.

FIGS. 11–13 illustrate various positions of the loader 14 during operation. FIG. 11 illustrates the loader 14 moving from a first position, shown in the left-hand portion of FIG. 11, to a loading position, shown in the right-hand portion of FIG. 11, in which the loader 14 is adjacent the cage assembly 10. This movement from the first position to the loading position includes a first pivoting movement which moves the loader 14 from a tilted position to a substantially vertical position and a second horizontal movement along the carriage rods 66.

When the upper and lower arms 60 of the loader 14 are positioned above and below the stacks of catalogs in the cage assembly 10, as shown in FIG. 1 and the right-hand portion of FIG. 11, the two lower arms 60 are driven upwards to compress the two stacks of catalogs between them, with sufficient pressure that the stacks of catalogs will be retained between the arms 60 regardless of the orientation of the loader 14.

Referring to FIG. 12, after the catalogs are compressed between the arms 60, the loader 14 then begins to move away from the cage assembly 10 (to the left in FIGS. 11 and 12) along the carriage rods 66 until the arms 60 clear the cage assembly 10, at which point the right-hand frame member 61 is moved towards the left-hand frame member 61 on the support shaft 72 via the rods 64 until there is no signficant space between the two stacks of catalogs held by the arms 60. The loader 14 also pivots slightly on the support shaft 72 in a counterclockwise direction, from its vertical position shown in the right-hand portion of FIG. 11 to the position shown in FIG. 12.

When the horizontally moving loader 14 reaches a position above an empty box 16 on the conveyor 68, the loader 14 pivots on the support shaft 72 in a clockwise direction, from its position shown in FIG. 12 to horizontal position, or unloading position, shown in FIG. 13. When the loader 14 pivots to its horizontal position, the lower arms 60 move downwardly (to the left as shown in FIG. 13) to release the catalogs. When the catalogs are released, the fall into the empty box 16 positioned below under the influence of gravity.

After the catalogs are released, the loader 14 is pivoted in a counterclockwise direction and moved to its position shown in the left-hand portion of FIG. 11, the right-hand frame member 61 is moved away from the left-hand frame member 61 along the support shaft 72 to its position as shown in FIG. 1, and the conveyor 68 is indexed so that the next empty box 16 is positioned for loading.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. An apparatus comprising:

a conveyor;

a cage assembly associated with said conveyor, said cage assembly having a first cage and a second cage, each of said first and second cages being movable between a loading position adjacent said conveyor and an unloading position, said first cage being dimensioned to receive two stacks of articles, one of said first and second cages comprising means for holding said two stacks in a first orientation when said one cage is in a first position and for holding said two stacks in a second orientation when said one cage is in a second position, one of said stacks occupying a first position relative to the other of said stacks when said stacks are in said first orientation and one of said stacks occupying a second position relative to the other of said stacks when said stacks are in said second orientation, said first relative position being different than said second relative position; and loading means for unloading said two stacks from one of said first and second cages and loading said two stacks into a shipping container.

2. An apparatus as defined in claim 1 wherein said holding means comprises means for holding said two stacks in an end-to-end orientation when said cage is in the loading position and for holding said two stacks in a side-to-side orientation when said cage is in the unloading position.

3. An apparatus comprising:

a conveyor;

a cage assembly associated with said conveyor, said cage assembly having a first cage and a second cage, each of said first and second cages being movable between a loading position adjacent said conveyor an an unloading position, said first cage being dimensioned to receive two stacks of articles, one of said first and second cages comprising means for holding said two stacks in a first relative orientation when said one cage is in a first position and for holding said two stacks in a second relative orientation when said one cage is in a second position, wherein each of said first and second cages comprises: a first structure having three side walls; a second structure having three side walls; and a hinge member pivotally connecting said first structure to said second structure; and loading means for unloading said two stacks from one of said first and second cages and loading said two stacks into a shipping container.

4. An apparatus as defined in claim 3 wherein said side walls of said first and second structures comprise a plurality of spaced-apart, vertically disposed rods.

5. An apparatus comprising:

a conveyor;

a cage assembly associated with said conveyor, said cage assembly having a first cage and a second cage, each of said first, and second cages being movable between a loading position adjacent said conveyor and an unloading position, said first cage being dimensioned to receive two stacks of articles, one of said first and second cages comprising means for holding said two stacks in a first relative orientation when said one cage is in a first position and for holding said two stacks in a second relative orientation when said one cage is in a second position, wherein said cage assembly comprises: an H-shaped member; a first U-shaped member pivotally connected to said H-shaped member; and a second U-shaped member pivotally connected to said H-shaped member; and loading means for unloading said two stacks from one of said first and second cages and loading said two stacks into a shipping container.

6. An apparatus as defined in claim 5 wherein said H-shaped member is rotatable about a vertical axis.

7. An apparatus as defined in claim 1 wherein said loading means comprises first and second clamping mechanisms, each of said clamping mechanisms comprising a pair of clamping arms vertically movable relative to each other.

8. An apparatus as defined in claim 7 wherein said first and second clamping mechanisms are relatively movable towards each other.

9. An apparatus as defined in claim 7 wherein said first and second clamping mechanisms are pivotable about a horizontal axis.

10. An apparatus as defined in claim 1 wherein said apparatus additionally comprises a second conveyor for conveying a plurality of shipping containers to a second loading position and wherein said loading means comprises:

first and second clamping mechanisms, each of said clamping mechanisms comprising a pair of clamping arms vertically movable relative to each other;

means for horizontally moving said first and second clamping mechanisms between a first position adjacent said cage assembly and a second position adjacent said second conveyor.

11. A method of transferring articles from a conveyor to shipping containers, said method comprising the steps of:

(a) moving said articles along said conveyor to a stacking position;

(b) at said stacking position, stacking said articles in a pair of stacks within a first cage, said pair of stacks having a first orientation when said articles are being stacked at said stacking position, one of said stacks occupying a first position relative to the other of said stacks when said stacks are in said first orientation;

(c) changing said first orientation of said stacks of articles to a second orientation, one of said stacks occupying a second position relative to the other of said stacks when said stacks are in said second orientation, said second relative position being different than said first relative position;

(d) unloading said stacks of articles from said first cage; and (e) loading said stacks of articles into a shipping container.

12. A method as defined in claim 11 additionally comprising the step of: (f) during one of said steps (d) and (e), transferring articles from said conveyor to a second cage when said second cage is in a loading position.

13. A method as defined in claim 11 wherein said step (b) comprises the step of (b1) transferring said articles from said conveyor to said first cage in said pair of stacks having a first relative orientation in which said articles in said stacks are oriented end-to-end.

14. A method as defined in claim 11 wherein said step (c) comprises the step of (c1) moving said first cage from a loading position to an unloading position and changing said first orientation of said stacks to a second orientation in which said stacks are oriented side-to-side.

* * * * *